Patented Aug. 10, 1948

2,446,522

UNITED STATES PATENT OFFICE 2,446,522

DIARYL NITROGENOUS HETEROCYCLIC ALKYLENE COMPOUNDS

Max Bockmühl and Gustav Ehrhart, Frankfort-on-the-Main, Otto Eisleb, Hofheim in Taunus, and Leonhard Stein, Bad Soden in Taunus, Germany, assignors, by mesne assignments, to Winthrop-Stearns Inc., New York, N. Y., a corporation of Delaware No Drawing. Application June 21, 1941, Serial No. 399,206. In Germany July 8, 1940

6 Claims. (Cl. 260—293)

The present invention relates to basic compounds; more particularly it relates to products of the following general formula:

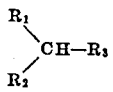

wherein $R_1$ and $R_2$ stand for aromatic radicals which may be bound together to form a bivalent aromatic radical, and wherein $R_3$ stands for a member of the group consisting of organic radicals containing secondary bound nitrogen and organic radicals containing tertiary bound nitrogen.

We have found that one hydrogen atom of the $CH_2$ group of diarylmethane or of the derivatives thereof may be replaced in a single operation or in several steps by organic radicals containing a secondary or tertiary nitrogen atom.

The process may be carried out, for instance, by causing a substituted or unsubstituted diarylmethane or diarylenmethane to react with an organic halide, for instance, an alkyl- or cycloalkylhalide containing secondary or tertiary nitrogen in the presence of an agent capable of splitting off hydrogen halide. Such halides are, for instance, piperidinoethylhalide, piperidinopropylhalide, piperidinobutylhalide, morpholinoethylhalide, morpholinopropylhalide, morpholinobutylhalide, N-methylhalogenpiperidine, N-ethylhalogenpiperidine, N-propylhalogenpiperidine, N-butylhalogenpiperidine, halogenethyldimethylamine, halogenpropyldimethylamine, acetylated halogenethylmonomethylamine or the like. Instead of the methylamines mentioned there may also be used the corresponding ethylamines, propylamines and butylamines. In these compounds the halogen atom may be the chlorine and bromine atom. Thus, for instance, diphenyldiethylaminopropane or diphenylpiperidinopropane are obtained by causing diethylaminoethylchloride or piperidinoethylchloride to act upon diphenylmethane in the presence of sodium, sodium amide, phenyl-sodium or another suitable alkali compound as an agent splitting off hydrogen halide.

Nitrogen containing alkylhalides with a branched carbon chain or nitrogen containing alicyclic halides, for instance, N-methyl-beta-halogenpiperidine may likewise be used in the above reaction. The process may also be carried out by using diarylmethanes whose aryls are linked with each other, for instance, with fluorene or other diarylenmethanes.

With a like or similar success the process of the present invention may be carried through in several steps. For instance, there is obtained by the action of chloroacetaldehydeacetal on diphenylmethane in the presence of agents splitting off hydrogen halide diphenylpropionaldehydeacetal which may be transformed by hydrolysis into the corresponding aldehyde. The latter yields by hydrogenation in the presence of primary or secondary amines the corresponding diphenylpropylamine-compounds.

The process in stages may also be carried out, for instance, so that diphenylmethane is transformed by means of ethylenechlorhydrine into the diphenylpropylalcohol which is converted into the corresponding chloride, and the latter is caused to react with a suitable base to form the diphenylpropylamine compound.

Or diphenylmethane is caused to react in an analogous manner with chloroacetonitrile with formation of diphenylpropionitrile which may either be hydrogenated catalytically to form the amine or be converted by means of methylmagnesiumbromide into diphenylethylmethylketone. The latter yields by hydrogenation in the presence of piperidine the alpha.alpha-diphenyl-delta-piperidinobutane.

Furthermore, it is possible to start from diarylmethane compounds which already carry a group effecting the linkage with the basic part, for instance, 1,1-diphenylacetone which, on introducing the nitroso group, yields the diphenylisonitrosoketone. By reduction and subsequent alkylation the latter is converted into the corresponding alkamine or amine.

The new products obtainable according to the present invention form water-soluble salts and have very good antispasmodic properties. They are suitable for use as pharmaceutical agents or for the preparation of new remedies.

The following examples serve to illustrate the invention but they are not intended to limit it thereto:

(1) A mixture of 336 grams of diphenylmethane and 235 grams of chlorobenzene is introduced drop by drop, while stirring, into 100 cc. of benzene containing 101 grams of finely cut sodium wire. The temperature is kept at about 35° C., advantageously by feebly cooling. After about 7–8 hours the reaction is finished. Thereupon, there are dropped in, likewise at 35° C., 240 grams of piperidinoethylchloride, the whole is stirred for 1 hour at room temperature and finally heated for 1 hour under reflux. Water is added to the cooled reaction mass. The benzene layer is separated and shaken with dilute hydrochloric acid. The aqueous acid solution is rendered alkaline whereby the alpha.alpha-diphenyl-gamma-piperidino-propane separates in the form of an oil which boils at 210° C.-220° C. under a pressure of 8 mm. In order to prepare the hydrochloride, the base is dissolved in ether and rendered feebly acid by means of alcoholic hydrochloric acid whereby the hydrochloride which first separates in the form of an oil very soon solidifies with formation of crystals. By recrystallization from alcohol and ether colorless crystals are obtained which melt at 214° C.-215° C.

The propane compound obtained corresponds with the following formula:

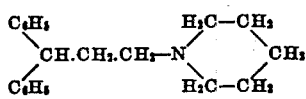

(2) A mixture of 27 grams of chlorobenzene and 34 grams of diphenylmethane is introduced, while stirring, into 100 cc. of benzene containing 11 grams of finely cut sodium wire. The temperature is kept for about 7 hours at 35° C.-40° C. Thereupon, 21 grams of morpholinoethyl-chloride are dropped in, while slightly cooling to about 30° C.-35° C. The whole is stirred for 1 hour at room temperature and finally boiled for 1 hour under reflux. By working up as described in Example 1, the alpha.alpha-diphenyl-gamma-morpholinopropane is obtained which boils at 210° C.-220° C. under a pressure of 8 mm. The hydrochloride forms colorless crystals melting at 205° C.-206° C. The compound obtained corresponds with the following formula:

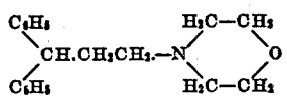

(3) A mixture of 21 grams of diethylacetonitrile and 25 grams of chlorobenzene is introduced, drop by drop, into 100 cc. of benzene containing 10 grams of finely cut sodium wire. The temperature rises very soon and, by gently cooling, is kept at 35° C. After 2 hours, the reaction is finished. Thereupon, a solution of 33 grams of fluorene in 100 cc. of benzene is caused to run in whereby the temperature increases only slightly. After stirring for 1 hour at room temperature, 24 grams of piperidinoethylchloride are dropped in, while cooling. In order to complete the reaction, the whole is further stirred for 1 hour at room temperature and, thereupon, boiled for 1 hour under reflux. There is obtained the alpha - diphenylene - gamma-piperidinopropane, boiling at 230° C.-240° C. under a pressure of 7 mm. and corresponding with the following formula:

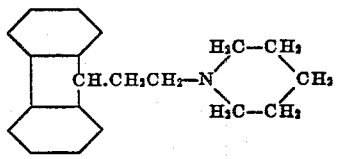

The hydrochloride melts at 205° C.

(4) A mixture of 13.5 grams of chlorobenzene and 17 grams of diphenylmethane is dropped, while stirring, into 50 cc. of benzene containing 5.5 grams of finely cut sodium wire. The temperature is kept for 7-8 hours at about 35° C. to about 40° C. Thereupon, a solution of 20 grams of 1.3-piperidinopropylbromide in 50 cc. of benzene is dropped in at 35° C. and, in order to complete the reaction, the whole is boiled for 1 hour under reflux. The alpha-alpha-diphenyl-delta-piperidinobutane boils under a pressure of 8 mm. at 225° C.-235° C. and corresponds with the following formula:

Its hydrochloride melts at 171° C.

(5) A mixture of 27 grams of chlorobenzene and 34 grams of diphenylmethane is dropped, while stirring, into 50 cc. of benzene containing 11 grams of finely cut sodium wire. The whole is treated as above described and, at 35° C., 30 grams of alpha-piperidino-beta-chloropropane are dropped in. There is obtained the alpha-alpha-diphenyl-beta-methyl-gamma-piperidino-propane boiling at 220° C.-230° C. under a pressure of 13 mm. and corresponding with the following formula:

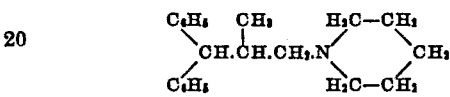

The hydrochloride melts at 211° C.-212° C.

(6) From diphenylmethane and N-methyl-3-chloropiperidine there is obtained under the same conditions the diphenyl-3-(N-methyl-piperidyl)-methane which boils at 195° C.-200° C. under a pressure of 8 mm. and corresponds with the following formula:

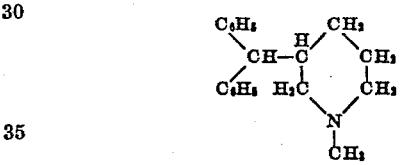

The hydrochloride melts unsharply at 110° C.-120° C. with decomposition.

(7) 67.2 grams of diphenylmethane yield with 60 grams of chloracetaldehyde-acetal in a benzene solution and in the presence of 20 grams of sodium and 50 grams of chlorobenzene the diphenylpropionaldehyde-acetal which, by heating for 1 hour on the steam bath with 100 cc. of a 2 N-sulfuric acid solution, while shaking, is transformed into the free aldehyde. The aldehyde boils at 190° C.-200° C. under a pressure of 13 mm.

5.6 grams of the aldehyde are hydrogenated with the aid of a nickel catalyzer in the presence of 3 grams of piperidine in alcoholic solution. The hydrogenation product is worked up as usual and is the alpha.alpha-diphenyl-gamma-piperidino-propane. The reaction takes the following course:

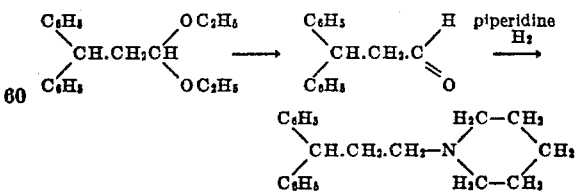

(8) 84 grams of diphenylmethane yield with 61 grams of acetic acid chloroethylester in the presence of chlorobenzene and sodium the acetic acid 1.1-diphenyl-propylester (3) which distils at 200° C. under a pressure of 18 mm. In order to saponify the acetyl compound 14 grams of the ester are heated on the steam bath for 2 hours together with 40 cc. of alcohol and 20 grams of caustic potash. After cooling the whole is diluted with water, extracted with ether and the residue of the ether is distilled under reduced pressure.

The diphenylpropanol boils at a temperature between 180° C. and 190° C. under a pressure of 18 mm. In order to transform it into the chloride, 10 grams of diphenylpropanol, 25 cc. of benzene and 10 grams of thionylchloride are boiled for 2 hours on the steam bath. After removal of the volatile substances, the chloride obtained is caused to react on the steam bath with 10 grams of piperidine. The reaction product is worked up and there is obtained the alpha.alpha-diphenyl-gamma-piperidinopropane.

The reaction takes the following course:

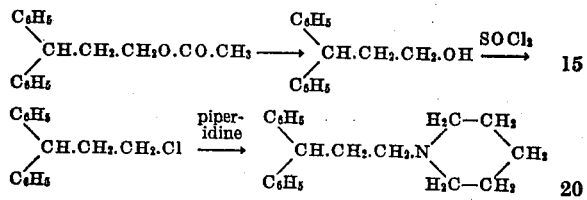

(9) 77 parts of diphenylmethane, 77 parts of toluene, 65 parts of beta-chloroethyl-diethylamine and 20 parts of finely pulverized sodium amide are boiled together for 6 hours under reflux. After cooling, water is added in order to dissolve the sodium chloride which has been separated; from the isolated toluene solution the base is extracted by shaking with dilute hydrochloric acid. The base is then separated from the said acid by means of caustic soda solution and forms an oil which is taken up in ether, isolated and, after drying, distilled over potassium carbonate. The base which boils at 170° C.–175° C. under a pressure of 4 mm., is a colorless oil. The hydrochloride prepared from the base in ether by means of alcoholic hydrochloric acid, is a colorless crystalline powder which melts at 143° C.–144° C.

The base corresponds with the following formula:

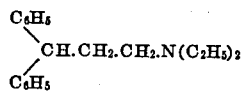

(10) 46 parts of fluorene, 80 parts of toluene, 37 parts of beta-chloroethyldiethylamine and 11 parts of finely pulverized sodium amide are heated together, while stirring. The reaction begins at 60° C. The mixture is slowly heated to 100° C. and kept at this temperature for 4 hours. After cooling, dilute hydrochloric acid is added until the reaction is acid towards Congo paper. From the separated aqueous salt solution the base is precipitated by means of caustic soda solution. The base distils as a colorless thick oil at 192° C.–210° C. under a pressure of 4 mm. Its acid sulfate is well crystallizable. It may be recrystallized from alcohol and is easily soluble in water. It melts at 217° C.–218° C.

The base corresponds with the following formula:

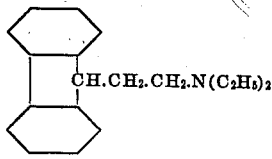

(11) 11.6 grams of N-butylethylenediamine are added to 23 grams of alpha-alpha-diphenylpropionic acid chloride in an open wide-necked flask and the whole is heated to 200° C. At this temperature 5 grams of phosphorus pentoxide are added and the whole is kept for half an hour at 200° C.–220° C. After cooling, the contents of the flask are mixed with water and caustic soda solution and shaken with ether. The isolated ethereal solution is washed several times with water and dried over sodium sulfate. After distillation of the ether a thick oil remains which distils under reduced pressure without decomposing. The alpha-alpha-diphenylethyl-N-butylimidazoline thus obtained boils at 186° C. under a pressure of 1 mm. The reaction takes the following course:

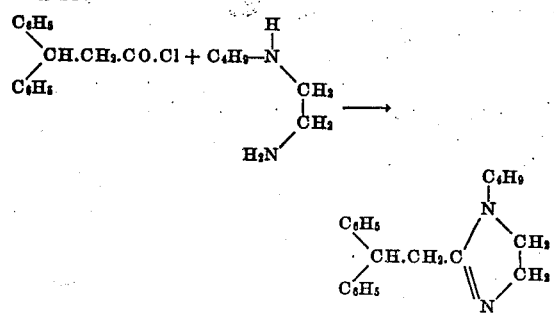

(12) 13.7 grams of benzhydrylacetone in 200 cc. of alcohol and 10 cc. of aqueous methylamine of 54 per cent strength are stirred in the presence of a nickel catalyzer and hydrogen at 120° C. under a pressure of 50 atmospheres. When the absorption of hydrogen is finished, the nickel is removed by filtering with suction, the alcohol is distilled off and the residue is treated with dilute caustic soda solution and ether. The dried ethereal solution is acidified with ethereal hydrochloric acid whereby the alpha.alpha-diphenyl-gamma + methylaminobutane - hydrochloride precipitates at once. After dissolution and re-precipitation from alcohol and acetic ester colorless prisms melting at 170° C.–172° C. are obtained.

The base corresponds with the following formula:

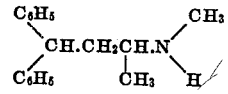

We claim:
1. A compound of the class consisting of amines of the formula

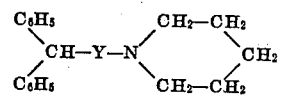

where Y is a lower alkylene chain having two to three carbon atoms separating the

and the —N portions of the amine molecule; and the water-soluble salts of said amines with non-toxic acids; said compound having pronounced antispasmodic properties.

2. As a new antispasmodic, a compound of the class consisting of an amine having the formula

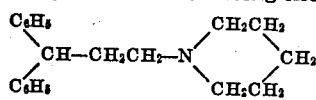

and its water-soluble salts with non-toxic acids.

3. As a new antispasmodic, a compound of the class consisting of an amine having the formula

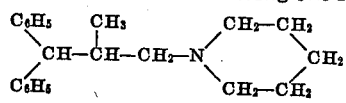

and its water-soluble salts with non-toxic acids.

4. A compound of the group consisting of amines having the formula

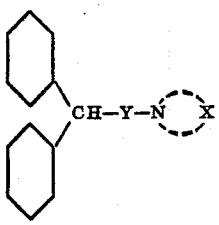

wherein Y is a lower alkylene chain having two to three carbon atoms separating the

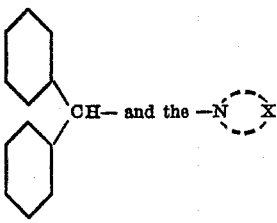

portions of the amine molecule and X represents the atoms necessary, with the N, to constitute a piperidine ring; and the water-soluble salts of said amines with non-toxic acids; said compound having pronounced anti-spasmodic properties.

5. As a new antispasmodic, a compound of the class consisting of an amine having the formula:

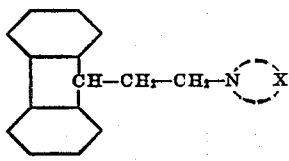

where the

portion of the molecule constitutes a piperidine ring and its water soluble salts with non-toxic acids.

6. A compound of the group consisting of amines having the formula

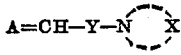

in which A=CH— is a member of the group of benzhydryl, having the formula

and 9-fluorenyl, having the formula

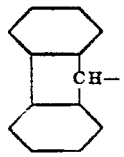

Y is a lower alkylene chain having two to three carbon atoms separating the A=CH and

portions of the amine molecule,

representing the atoms necessary to constitute a six membered unsubstituted saturated hetero monocyclic ring and selected from the group consisting of morpholine and piperidine and the water-soluble salts of said amines with non-toxic acids, said compound having pronounced antispasmodic properties.

MAX BOCKMÜHL.
GUSTAV EHRHART.
OTTO EISLEB.
LEONHARD STEIN.

REFERENCES CITED

The following references are of record in the file of this patent:

UNITED STATES PATENTS

| Number | Name | Date |
|---|---|---|
| 2,278,123 | Heyn | Mar. 31, 1942 |
| 2,180,334 | Bliche | Nov. 21, 1939 |
| 2,079,962 | Miescher | May 11, 1937 |
| 1,913,621 | Williams | June 13, 1933 |

FOREIGN PATENTS

| Number | Country | Date |
|---|---|---|
| 364,046 | Germany | Nov. 16, 1922 |

OTHER REFERENCES

Comptes Rendus, vol. 175 (1922) p. 1150.
Comptes Rendus, vol. 183 (1926), pp. 302 and 303.
J. Prak. Chem. Series 2, vol. 77, pp. 22 and 25.
Bull. Soc. Chem. (Paris), vol. 3, Series 5 (1936), pp. 1086, 1088.
J. Chem. Soc. (London) 1934, p. 281.
Beilstein, vol. 4, pp. 312, 313.
Standard Chemical and Technical Dictionary p. 51 (1931), Chemical Publishing Co.
Chemical Rubber Handbook, p. 540, 25th edition.
Bull. Fac. Sci. V, Franco-Chinoise, Peiping, Nov. 1, 1934; pp. 27 and 35.